Dec. 27, 1949    G. D. HARDING    2,492,746
VOLTAGE DOUBLER

Filed Jan. 8, 1947    2 Sheets-Sheet 1

Inventor:
George D. Harding,
by Ernest C. Britton
His Attorney.

Dec. 27, 1949　　　G. D. HARDING　　　2,492,746
VOLTAGE DOUBLER
Filed Jan. 8, 1947　　　2 Sheets-Sheet 2

Inventor:
George D. Harding,
by Ernest A. Britton
His Attorney

Patented Dec. 27, 1949

2,492,746

UNITED STATES PATENT OFFICE 2,492,746

VOLTAGE DOUBLER

George D. Harding, Pittsfield, Mass., assignor to General Electric Company, a corporation of New York Application January 8, 1947, Serial No. 720,907

2 Claims. (Cl. 321—15)

1

This invention relates to voltage doublers and more particularly to improvements in static high voltage, low power, direct current supply units which are adapted to be cascaded.

A well known way of obtaining small direct currents at high voltage is to cascade duplicate low voltage supply units. One form of such units is a static voltage doubler comprising a transformer, rectifiers and capacitors so connected that the capacitors are charged to a voltage twice that of the transformer output. In cascading such units, the output capacitors are connected in series and the input sides of the units are connected in parallel. Such cascaded units are useful for supplying relatively small amounts of direct current at high voltage to X-ray tubes, electrostatic precipitation equipment, electrostatic paint spraying equipment, equipment for electrocoating of fabrics, and detearing processes.

In accordance with this invention, an improved unit of the above type is provided which is characterized by an all-metal casing to which the electrical mid-point of the voltage divider capacitors and one terminal of the high voltage winding of the transformer are directly connected whereby the maximum voltage applied to the insulation is half the output voltage of the unit.

Another feature comprises mounting the rectifiers on the outside of the metal casing whereby their connections are readily changed for reversing the polarity of the output voltage.

A further feature is that the metal main casing for the transformer and the metal capacitor casing can be directly attached to each other without any insulation between them.

An object of the invention is to provide a new and improved voltage doubler.

Another object of the invention is to provide an improved high voltage static, direct current supply unit having materially reduced insulation requirements.

A further object of the invention is to provide an improved static voltage doubler suitable for cascading which is so arranged that the polarity of its output voltage is easily reversed.

An additional object of the invention is to provide a static high voltage, direct current supply unit suitable for cascading which has an all-metal casing.

The invention will be better understood from the following description taken in connection with the accompanying drawing and its scope will be pointed out in the appended claims.

Figure 1:
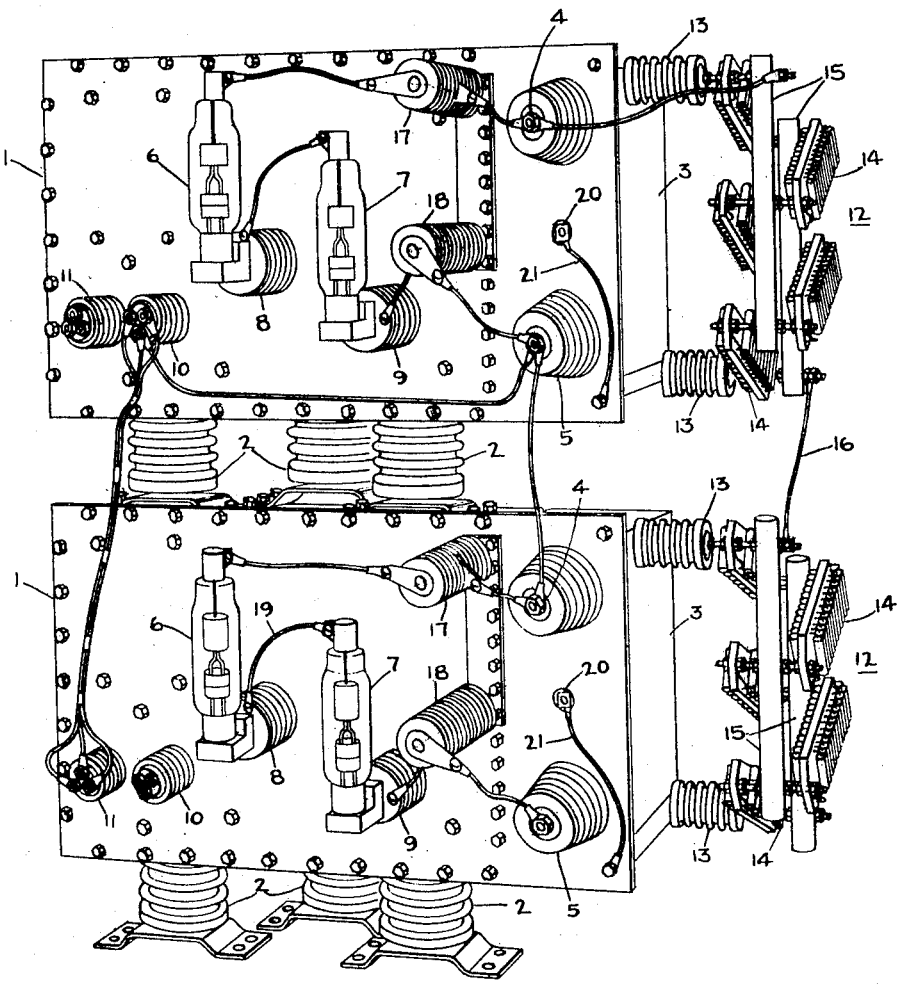
Figure 3:
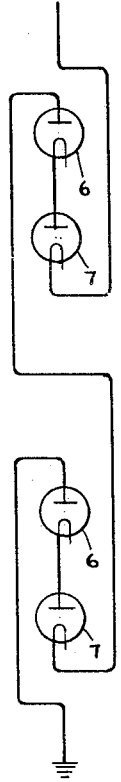
Figure 2:
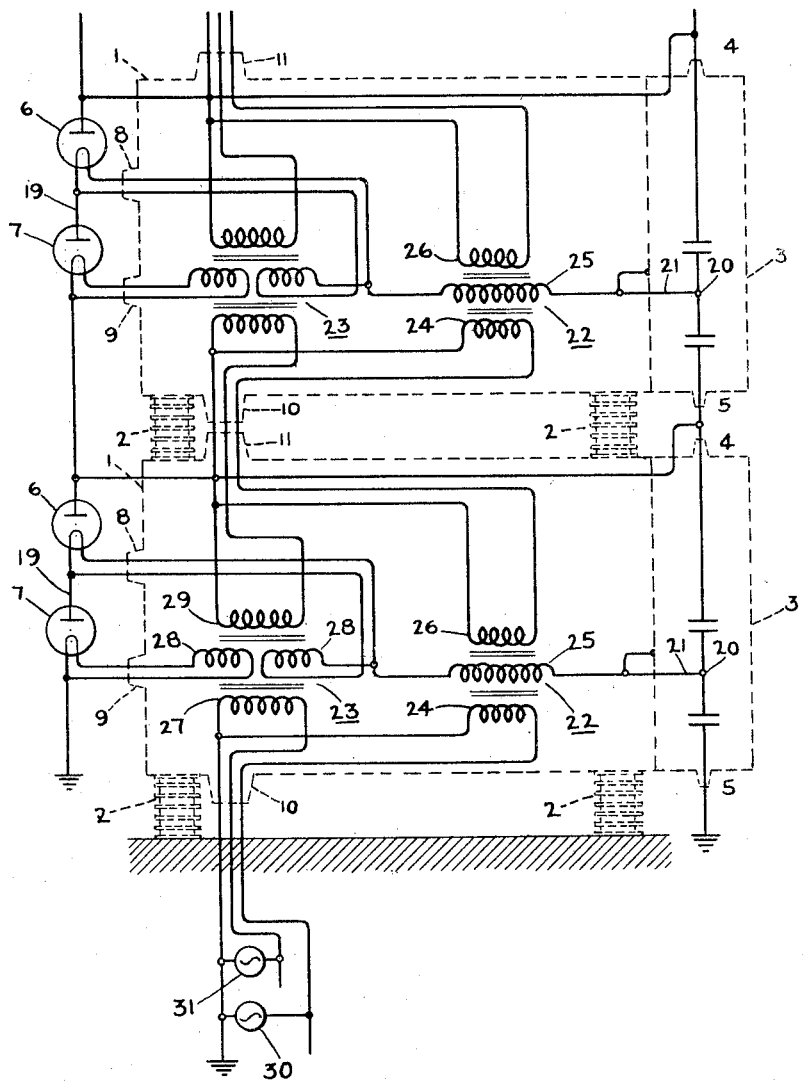

In the drawing, Fig. 1 is a perspective view of two units embodying a preferred form of the invention arranged in cascaded relationship; Fig. 2 is a circuit diagram of the connections of the units shown in Fig. 1, and Fig. 3 is a diagram illustrating the change in connections which is employed for reversing the polarity of the output voltage of the circuit shown in Fig. 2.

Referring now to the drawing and more particularly to Fig. 1, each of the two units comprises a main steel case 1 mounted on three insulating feet 2. Directly attached at the right-hand side of each main case 1 is a steel capacitor case 3 having a pair of insulated output terminals 4 and 5.

The rectifiers of the units are shown at 6 and 7 as comprising high voltage vacuum tube devices. These are mounted on insulated supports 8 and 9 respectively through which cathode heating supply conductors are led.

Each unit has three input terminals mounted on a common bushing 10 and has a corresponding set of output terminals mounted on adjacent bushing 11 and it will be seen in Fig. 1 that the output terminals of the lower unit are connected by three conductors to the input terminals of the upper unit. Likewise, capacitor terminal 4 of the lower unit is connected to the capacitor terminal 5 of the upper unit so that the capacitors of the two cascaded units are serially connected.

For use in measuring the output voltage of the units, they are provided with high voltage, high resistance potentiometers 12 mounted on insulating supports 13. As shown, these comprise a plurality of high resistance strips 14 which are serially connected in zigzag formation between a pair of parallel insulating rods 15. The potentiometers 12 are serially connected by jumper 16.

The connections between the capacitor terminals 4 and 5 and the terminals of the rectifiers 6 and 7 are made by means of insulated terminal posts 17 and 18 on the main casing 1. Thus, connections between the anode of the rectifier 6 and the capacitor terminal 4 are made by means of the post 17 and the connections between the cathode of the rectifier 7 and the capacitor terminal 5 are made by means of the post 18. The anode of the rectifier 7 and the cathode of the rectifier 6 are directly interconnected by a lead 19.

The capacitor case 3 contains two series connected capacitors, each having one side connected to a terminal 20 which is directly grounded or connected to the metal case 3 by a lead 21.

The apparatus inside the main casing 1 comprises a main transformer 22 and a cathode heating transformer 23. The main transformer 22 comprises an exciting or primary winding 24, a high voltage secondary winding 25 and a tertiary winding 26 which is similar to the primary winding 24 and which is used for exciting the primary winding 24 of the main transformer 22 of the unit directly above it. The high voltage winding 25 has one terminal directly connected to the metal casing 1 and has its other terminal directly connected to the jumper 19 which directly interconnects the cathode of the rectifier 6 with the anode of the rectifier 7.

The cathode heating transformer 23 has an exciting or primary winding 27 and a pair of duplicate secondary windings 28 which are connected respectively to excite the cathodes of the rectifiers 6 and 7. In addition, the transformer 23 has a tertiary winding 29 which is similar to the primary winding 27 and which is used to excite the primary winding of the corresponding transformer 23 in the next adjacent cascaded unit.

The operation of the units is as follows:

Considering first the lowermost unit, a suitable source of alternating current supply 30 is connected across the primary winding 24 of the main input transformer 22 and likewise a suitable source of current supply 31 is connected across the primary winding 27 of the cathode heating transformer 23. Assuming now the unit is energized in the manner indicated, the rectifier 6 will allow the high voltage winding 25 to charge the capacitor connected to terminal 4 in such a way that the terminal 4 is negative relative to the metal casing and the rectifier 7 will allow the winding 25 to charge the capacitor connected to the terminal 5 in such a way that the terminal 5 is positive relative to the metal casing. The voltage to which these terminals are charged relative to the metal casing is substantially equal to the voltage of the high voltage winding 25 so that the voltage difference between the terminals 4 and 5 is twice the voltage of the winding 25 and in this manner the voltage of the winding 25 is doubled. By means of the interconnections between the units, the second unit is energized in exactly the same way so that twice the voltage of the winding 25 of its transformer 22 is developed across its terminals 4 and 5 so that with these terminals connected in series as shown, the total output voltage will be twice the output voltage of one unit. In this manner, any desired voltage can be obtained by cascading the proper number of units.

Assuming that the lowermost unit is mounted on a surface which is at ground potential, then the voltage relative to ground of the metal casing of succeeding units becomes higher and higher in multiples of the voltage of each unit but as the insulating feet 2 separate each of the units, the requisite increase in dielectric strength between ground and each succeeding unit increases in proportion. However, it will be observed that the voltage of corresponding parts of all units is exactly the same relative to each other so that, for example, the voltage between terminal 4 of each unit and its metal casing is exactly the same.

By reason of the direct connection of the capacitor midpoint and one terminal of the high voltage winding 25 to the metal casing, it is clear that the maximum voltage which can exist between any part of each unit and its metal casing is only one-half the output voltage of the unit so that no parts of the unit need be insulated for the full output voltage of the unit.

Fig. 3 illustrates how the connections between the rectifiers 6 and 7 are changed when it is desired to reverse the polarity of the output voltage of the cascaded units.

While there has been shown and described an embodiment of the invention, it will be obvious to those skilled in the art that changes and modifications can be made therein without departing from the invention and consequently it is aimed in the appended claims to cover all such changes and modifications as fall within the true spirit and scope of the invention.

What I claim as new and desire to secure by Letters Patent of the United States, is:

1. A full wave voltage doubler comprising, in combination, conducting casing means, a pair of capacitors in said casing means, each capacitor having a terminal connected directly to said casing means, a pair of insulated terminals extending through said casing means, the remaining terminals of said capacitors being connected respectively to the inner ends of said insulated terminals, a transformer in said casing means having a high voltage winding with one terminal connected directly to said casing means, a pair of rectifiers mounted on the outer side of said casing means, said rectifiers each having an anode and cathode, means for connecting the anode of one rectifier and the cathode of the other rectifier to the other terminal of said high voltage winding, and means for selectively connecting the remaining anode and cathode to the outer ends of said insulated terminals respectively.

2. In a full wave voltage doubler, a metal capacitor case, a pair of capacitors therein, each having a terminal connected directly to said case and each having a remaining free terminal extending through and insulated from said case, a main metal case, a transformer in said main case having a high voltage winding with one terminal connected directly to said main case and another terminal insulated therefrom, a pair of rectifiers mounted on the outside of said main metal case, each of said rectifiers having an anode and a cathode, the anode of one rectifier and the cathode of the other rectifier being connected directly to said other terminal of said high voltage winding, connections between the remaining anode and the remaining cathode of said rectifiers and the free terminals of said capacitors for causing twice the voltage of said high voltage winding to appear between said free terminals of said capacitors, and means for directly fastening said cases together without insulation therebetween.

GEORGE D. HARDING.

REFERENCES CITED

The following references are of record in the file of this patent:

UNITED STATES PATENTS

| Number | Name | Date |
|---|---|---|
| 1,754,799 | Mutscheller | Apr. 15, 1930 |
| 2,243,941 | Bouwers | June 3, 1941 |
| 2,305,720 | Lindenblad | Dec. 22, 1942 |